July 5, 1932.    T. GRISWOLD, JR    1,866,160
GASKET JOINT
Filed Aug. 11, 1927    2 Sheets-Sheet 1

INVENTOR.
Thomas Griswold Jr.
BY
Fay, Oberlin & Fay
ATTORNEYS.

July 5, 1932.  T. GRISWOLD, JR  1,866,160
GASKET JOINT
Filed Aug. 11, 1927  2 Sheets-Sheet 2

INVENTOR.
Thomas Griswold Jr
BY
Fay, Oberlin & Fay
ATTORNEYS.

Patented July 5, 1932

1,866,160

UNITED STATES PATENT OFFICE

THOMAS GRISWOLD, JR., OF MIDLAND, MICHIGAN, ASSIGNOR TO THE DOW CHEMICAL COMPANY, OF MIDLAND, MICHIGAN, A CORPORATION OF MICHIGAN

GASKET JOINT

Application filed August 11, 1927. Serial No. 212,189.

While the maintenance of joints in pipes, vessels, etc., under pressures usual heretofore has offered no great difficulty, if it be attempted to apply the constructions which have been devised for that usage to joints which are put under very high pressures failure results, particularly if high temperatures are employed at the same time. At the outset, materials such as rubber and fabric which ordinarily are successfully used, are impossible with high pressure and temperature conditions. Moreover, unusual stresses at the joint surfaces are encountered. When in addition to this, active chemicals are the substances, and these be heated, and at high pressures for example on the order of 2000 to 10000 pounds per square inch, the difficulties in holding tight joints are enormous. I have now devised a system of sealing joints, however, which is very desirable for any such usages.

To the accomplishment of the foregoing and related ends, the invention, then, consists of the features hereinafter fully described, and particularly pointed out in the claim, the following description and the annexed drawings setting forth in detail certain features embodying the invention, such being illustrative however of but a few of the various ways in which the principle of the invention may be employed.

In said annexed drawings:—

Figure 1:
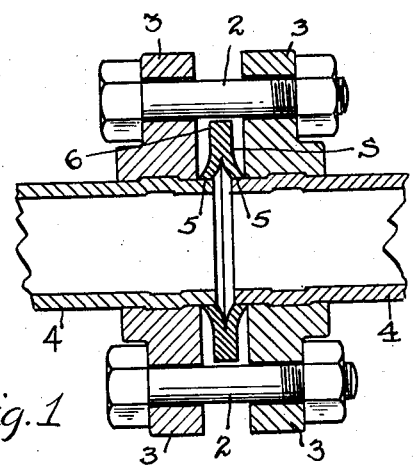
Figure 2:
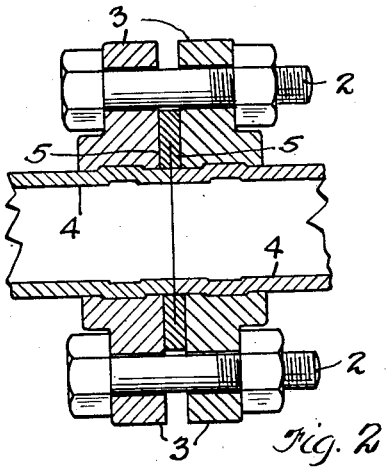

Fig. 1 is an axial section through a joint in accordance with my invention, the parts not being yet drawn clear up; Fig. 2 is a similar view, showing the relation of the parts as drawn completely together; and Figs. 3 to 14 inclusive are sectional details of modifications.

In its general aspects, the invention contemplates an endless, sealing member adapted to coact with surfaces to be sealed and which when clamped develops a sealing pressure transverse to the clamping pressure. With two members to be sealed tightly together, as a cover-head and a vessel, or two pipe ends as illustrated in Fig. 1, draw-up bolts 2 suitably engaged in flanges 3 attached to the respective members 4 to be sealed are arranged so as to allow the sealing member S to be seated in position therebetween. In its usual form, the sealing member or gasket is of endless or ring type, the precise shape of course depending upon the particular surfaces being sealed, and skirt-flanges 5 of divergent relationship project from the sealing member to engage against respective surfaces to be sealed. In the case of cylindrical surfaced pipe ends, one of the skirt-flanges will be seated upon one of the marginal portions of its adjacent pipe end, and the other flange will be seated on the remaining pipe end, as shown for example in Fig. 1.

On now drawing up on the bolts 2, the flanges 3 will be forced toward each other, thereby pressing the skirt-flanges 5 of the sealing member into closer and closer engagement with the margins of the pipe or other structures being sealed. A certain wedging effect is thus had, such skirt-flanges being forcibly driven against the surfaces to be sealed, in a direct bedding relation, and the tighter the joint is drawn, the more deeply the wedging effect is realized.

Figure 3:
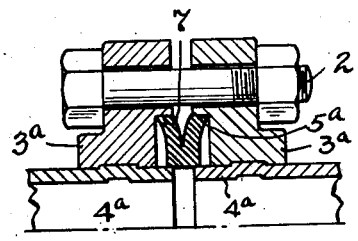

By proportioning a body mass 6 of sufficient relative strength, any outward thrust developed will be sustained thereby, and it will be unnecessary to provide an abutment externally to support the sealing member or ring. If preferred, however, and in some instances this is desirable, a thrust abutment may be arranged to take care of any back thrust components developed, and the sealing member may be at the same time made of lighter body. As shown in Fig. 3, such transverse-thrust abutments may take the form of ledges or shoulders 7 on the flanges 3a, the sealing member here having its body portion directed inwardly to seat against the members 4a to be sealed, while the skirt-flanges 5a are directed outwardly.

Figure 4:
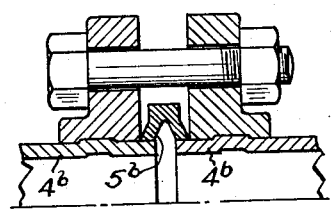
Figure 5:
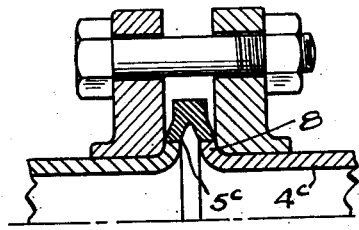

As shown in Fig. 4, the sealing member is of relatively shorter frusto-conical form, the skirt-flanges 5b resting against the surfaces of the members 4b to be sealed; and in Fig. 5 the engagement of the skirt-flanges 5c is shown as in relation with the out-turned edges 8 of the members 4c to be sealed.

Figure 6:
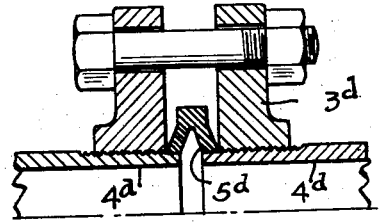

In some instances, instead of take-up flanges secured to the members to be sealed by grooved seatings, as illustrated in Figs. 1, 3 and 4, such take-up flanges may be screw threadedly engaged, as in the case of the flanges 3d on the members 4d, Fig. 6.

Figure 7:
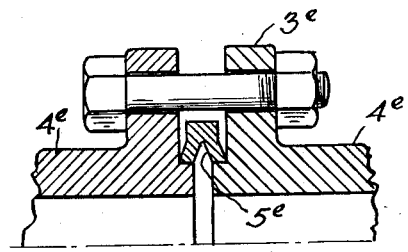

Fig. 7 illustrates the application of a sealing member in accordance with my invention as applied directly to members 4e to be sealed, such members being provided with ears 3e for receiving take-up bolts. The sealing ring here is arranged with its flanges 5e against the respective outer margins of the members.

Figure 8:
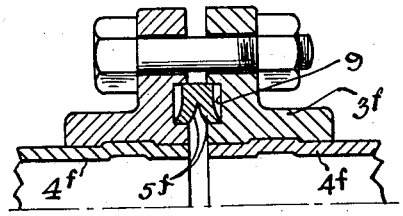
Figure 9:
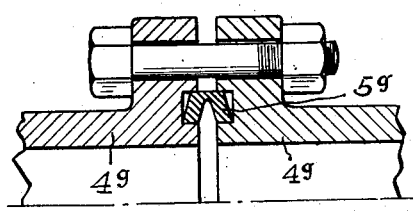
Figure 10:
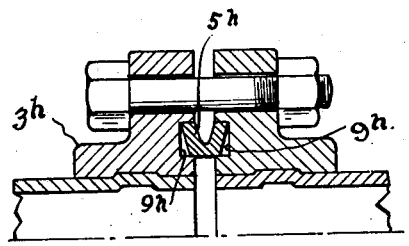

Fig. 8 illustrates the invention as embodied in a sealing member in conjunction with flanges 3f on the members 4f to be sealed, each such flange having a groove 9 in which the sealing-member may lodge, the skirt-flange 5f thereof being abutted against the inner face of the groove. Somewhat analogously, in Fig. 9, a sealing arrangement for members 4g is shown. In Fig. 10 also along similar general lines, the sealing-member is shown as arranged in mating grooves 9h in the flanges 3h, the sealing member here however being reversed such that the skirt-flanges project outwardly to seat against the outer faces of the groove.

Figure 11:
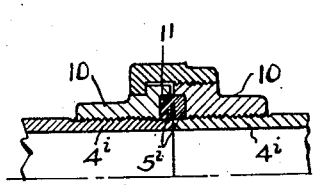

A screw-union type of take-up, instead of a bolt take-up is shown in conjunction with screw collars 10 in Fig. 11, the collars 10 engaging with the ends of pipes 4i and the collars being provided with an outer shoulder or ledge 11, such that the sealing-ring may seat therewithin, its skirt-flanges 5i bearing against the marginal portion of the pipe ends.

Figure 12:
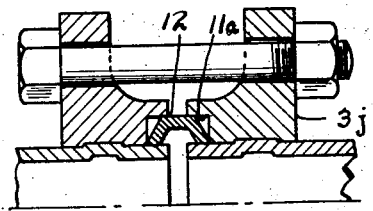

In Fig. 12 there is shown a further modification in which the sealing member is of wider cross section, the back 12 of the body being shaped to seat against shoulders or outer limiting walls 11a on the flange members 3j. In this case the body of the sealing-member may be of such section only as necessary to hold its shape against the retaining walls, as these are drawn into sealing position.

Figure 13:
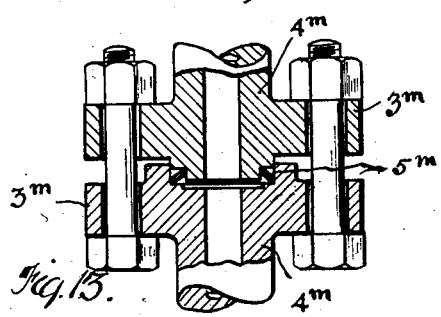
Figure 14:
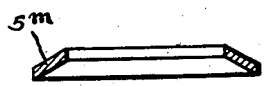

A somewhat simpler modification is shown in Figs. 13 and 14, in which the sealing member has the form of a single divergent or non-planar engaging element 5m initially shaped on the order of a frustrum of a cone or pyramid, in accordance with the sectional area of the joint surfaces with which it is to be used, the sealing member being seated between inner and outer walls spaced in the members 4m to be sealed. On tightening up the bolts in the flanges 3m, the sealing member 5m being pressed axially exerts a thrust transversely and beds its edges against the inner and outer walls which it encounters. Preferably a resilient but slightly ductile material, as for instance steel or brass, is used as construction-material for the sealing member, and thus tight engagement may be had without damage to the joint-surfaces.

While in some instances the sealing members contemplated in this invention may be made of an elastic ductile material highly resistant against chemical action, as for instance phenol formaldehyde condensation composition, ordinarily I prefer to make such members of metal, steel, copper, brass, Monel metal, etc., these being best adapted to receive the very high stresses encountered in high pressure application, particularly where direct chemical attack can be avoided.

It will be perceived that the material in the body of the sealing ring is upset or compressed in a diametral or radial direction, or broadly, in a direction transverse to the clamping force. At the end of the clamping act this transverse compression and reaction to it of co-acting joint surfaces is intended to be at right angles with the clamping force, so that the resolved component in said transverse direction of the clamping force approaches infinity and the ratio of travel of the clamping force to the change in shape of the sealing ring or the flow of material in the body of the sealing ring approaches infinity to 1. It follows therefore that slight recessions of the joint members due to stretch of the bolts or change in their length, due to temperature or due to outside stresses applied to the members joined, will have almost zero effect upon the transverse sealing pressure between the sealing member and the joint surfaces. It follows therefore that when this joint is made up it is no longer dependent for tightness upon the clamping force and disturbances varying that clamping force within reasonable limits will have no effect upon the sealing of the joint. This phenomena is the distinctive feature of the invention and differentiates it from all other gasketed joints, in which the sealing pressure exerted between the gasket and the joint surfaces is in line with the clamping force. Since under such relations of sealing pressure and clamping force variations in one are followed by corresponding variations in the other, forces internal or external to the joint, modifying microscopically even the space relations between the joint surfaces, affect quantitatively the sealing pressure and the tightness of the joint.

It will thus be seen that in any of the usages contemplated, a sealing member is had which may be seated with respect to the surfaces to be sealed, and in such arrangement as to develop a diametral pressure when compressed axially or develop a transverse sealing pressure against such surfaces in proportion as the members are drawn together, the sealing member itself tending to bed into the adjacent surfaces more firmly as the joint is drawn up.

Leakage may thus be guarded against in a manner aptly adequate with a very great range of pressures, even where the further factor of high temperatures may be concerned.

Other modes of applying the principle of the invention may be employed, change being made as regards the details disclosed, provided the means stated in the following claim or the equivalent of such be employed.

I therefore particularly point out and distinctly claim as my invention:—

In a joint of the character described, flanged pipe ends in alignment adapted to be connected together, said pipe ends having oppositely disposed shoulder recesses inwardly directed and outwardly directed, means for sealing said joint comprising a gasket ring member having cone-like faces and an inner edge-surface engaging the outwardly directed recess of one pipe end, and an outer edge-surface engaging the inwardly directed recess of the other pipe end, and means for drawing the pipe ends toward each other and forcing said gasket edges into close engagement with the walls of said recesses.

Signed by me this 29 day of July, 1927.

THOMAS GRISWOLD, Jr.